United States Patent [19]

Morris et al.

[11] Patent Number: 5,216,836

[45] Date of Patent: * Jun. 8, 1993

[54] MOVABLE ROOT CONTACT/PRESSURE PLATE ASSEMBLY FOR HYDROPONIC SYSTEM

[75] Inventors: Carlton E. Morris; Philip A. Loretan; Conrad K. Bonsi; Walter A. Hill, all of Tuskegee, Ala.

[73] Assignee: Tuskegee University, Tuskegee, Ala.

[ * ] Notice: The portion of the term of this patent subsequent to Aug. 29, 2006 has been disclaimed.

[21] Appl. No.: 371,620

[22] Filed: Jun. 27, 1989

Related U.S. Application Data

[63] Continuation of Ser. No. 156,013, Feb. 16, 1988, Pat. No. 4,860,490.

[51] Int. Cl.⁵ .............................................. A01G 31/02
[52] U.S. Cl. ...................................... 47/62; 47/63
[58] Field of Search ............... 47/59, 62, 63, 64, 65, 47/79, 80, 41, 11, 14

[56] References Cited

U.S. PATENT DOCUMENTS

| | | | |
|---|---|---|---|
| 1,251,826 | 1/1918 | Schroeder | 47/14 |
| 2,198,150 | 4/1940 | Barnhart | 47/62 |
| 2,205,303 | 5/1940 | Munsell | 47/63 |
| 2,492,152 | 12/1949 | Hollowell | 47/80 |
| 3,603,034 | 9/1971 | Stewart | 47/79 |
| 3,744,183 | 7/1973 | Kato | 47/62 |
| 3,830,013 | 8/1974 | Lesley . | |
| 4,035,950 | 7/1977 | Anselm | 47/59 |
| 4,086,725 | 5/1978 | Li . | |
| 4,118,891 | 10/1978 | Kehl et al. . | |
| 4,161,193 | 7/1979 | Freychet et al. . | |
| 4,166,341 | 9/1979 | Vestergaard | 47/65 |
| 4,291,499 | 9/1981 | Prewer . | |
| 4,294,037 | 10/1981 | Mosse et al. | 47/59 |
| 4,312,152 | 1/1982 | Drury et al. | 47/62 |
| 4,328,641 | 5/1982 | Tesch . | |
| 4,392,327 | 7/1983 | Sanders | 47/59 |
| 4,392,328 | 7/1983 | Walker | 47/62 |
| 4,399,634 | 8/1983 | O'Hare . | |
| 4,487,164 | 12/1984 | Yanagisawa . | |
| 4,536,988 | 8/1985 | Hogen . | |
| 4,607,454 | 8/1986 | Koike . | |

FOREIGN PATENT DOCUMENTS

| | | | |
|---|---|---|---|
| 61244 | 7/1982 | European Pat. Off. | 47/59 |
| 173494 | 7/1906 | Fed. Rep. of Germany | 47/14 |
| 1066475 | 1/1984 | U.S.S.R. | 47/14 |
| 1054939 | 12/1985 | U.S.S.R. | 47/59 |
| 2089632 | 6/1982 | United Kingdom | 47/61 |

OTHER PUBLICATIONS

The Sweet Potato for Space Missions; Walker A. Hill et al.; 1984; pp. 1-49.
Report: Social Crop Scientific Breeding, Kinki; Tutomu Uewada; 1987; pp. 60-64.
Effect of Nutrient Level on the Growth and Chemical Composition of Sweet Potatoes in Sand Cultures; O. A. Leonard et al.; 1947; pp. 223-236.

*Primary Examiner*—Danton D. DeMille
*Attorney, Agent, or Firm*—Jones, Tullar & Cooper

[57] ABSTRACT

A hydroponic system for growing sweet potatoes and other root and tuber crops includes a growing channel incorporating a movable root contact/pressure plate assembly. The assembly consists of a flat, rigid PVC plate in which holes for inserting plants are drilled and a flexible vinyl film which is secured along the length of each side edge of the plate, by means of pressure fit connectors. The assembly is secured to the top edges of a growing channel, again by pressure fit connectors. The flexible film suspends the plate near and parallel to the bottom of the growing channel, with the flexibility of the film allowing upward movement of the plate within the channel as the plant roots grow. The assembly provides contact and pressure to the plant roots inside the growing channel thereby promoting enlargement of the roots. This enlargement causes the assembly to move upwardly, thereby maintaining the desired pressure conditions during growth. A suitable nutrient solution is supplied in the growing channel.

10 Claims, 4 Drawing Sheets

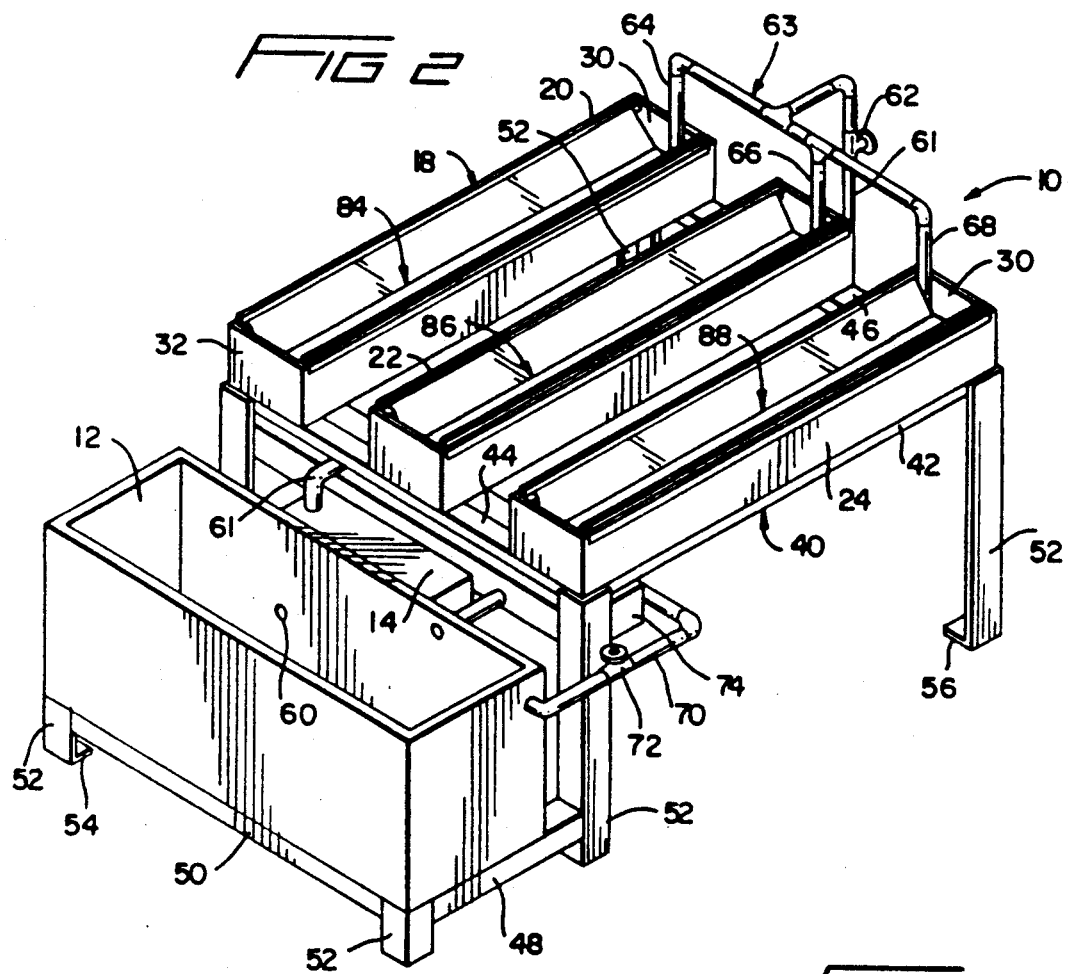
FIG 2
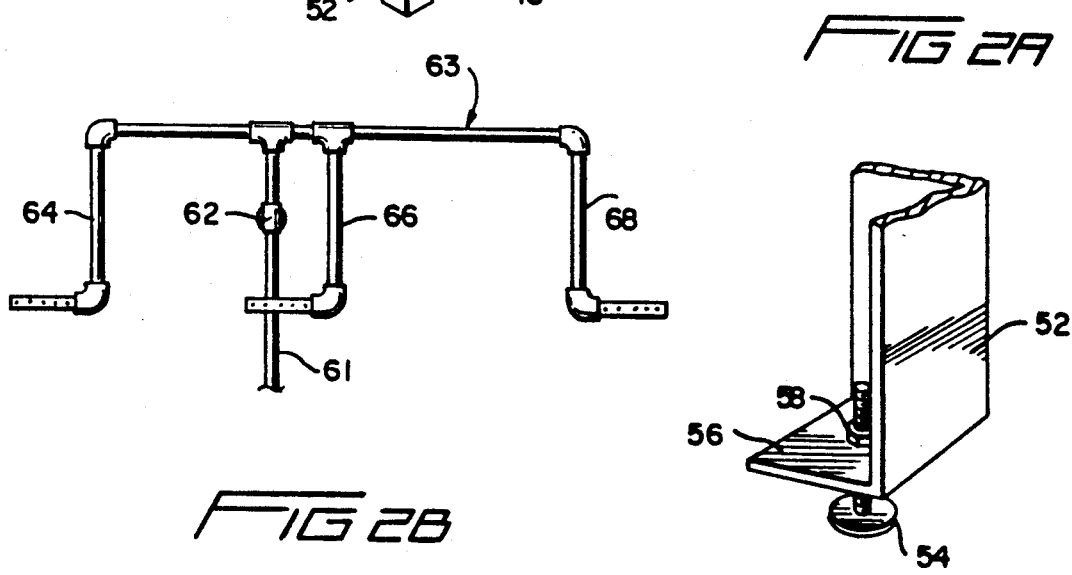
FIG 2B
FIG 2A

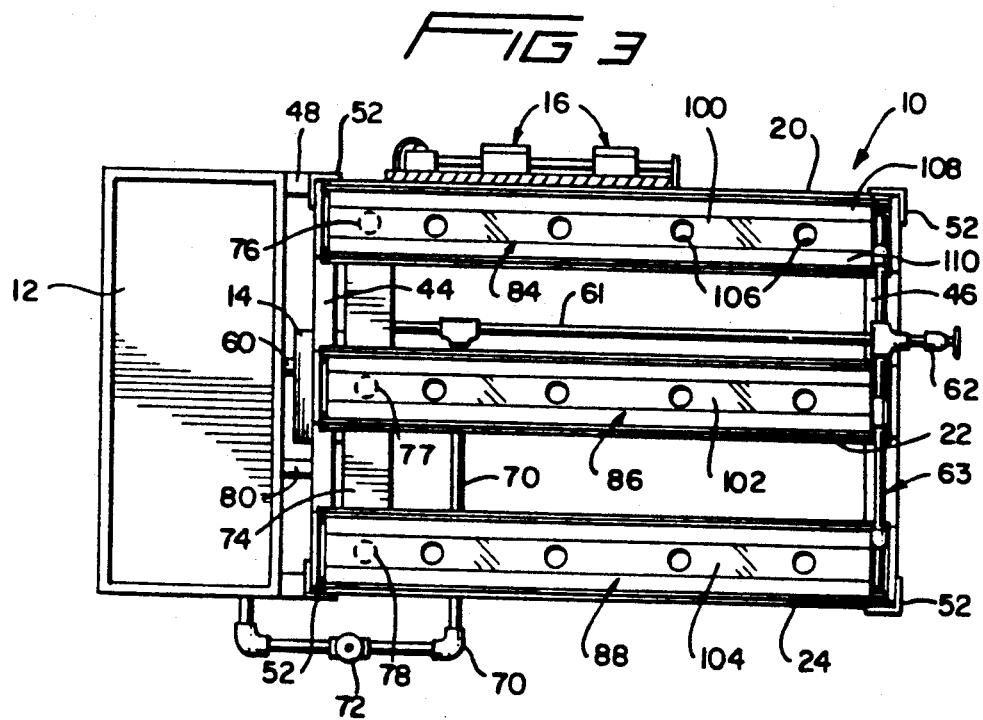
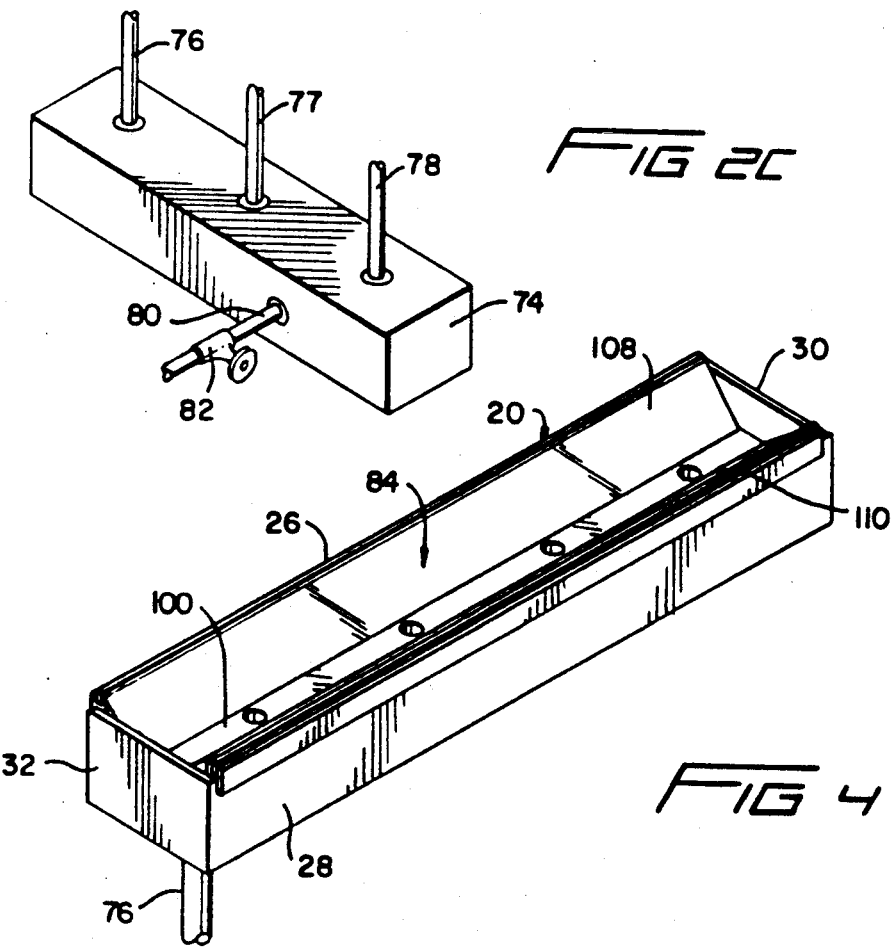

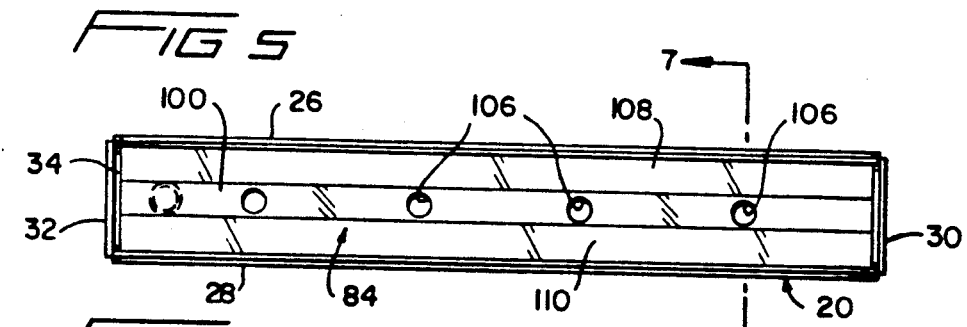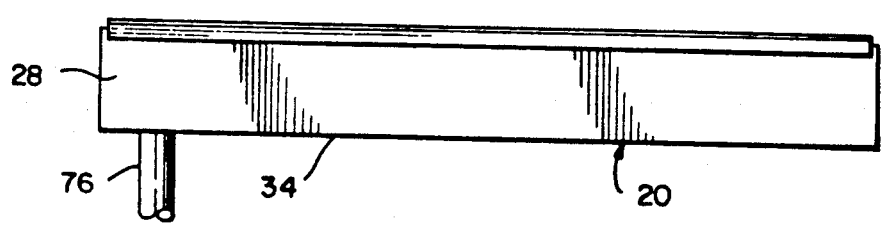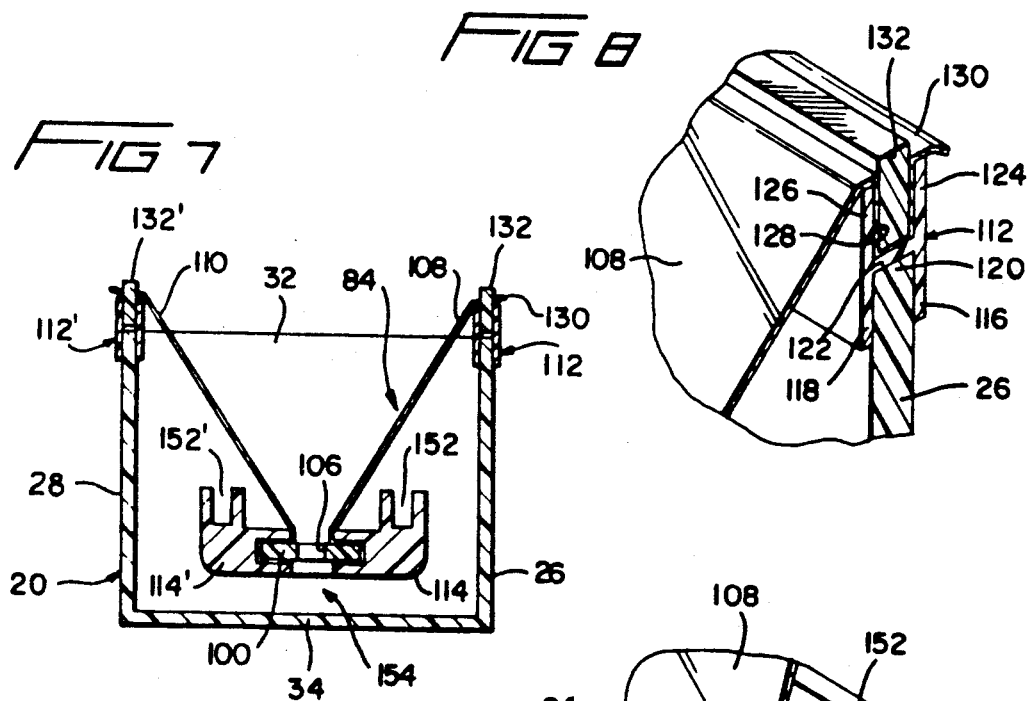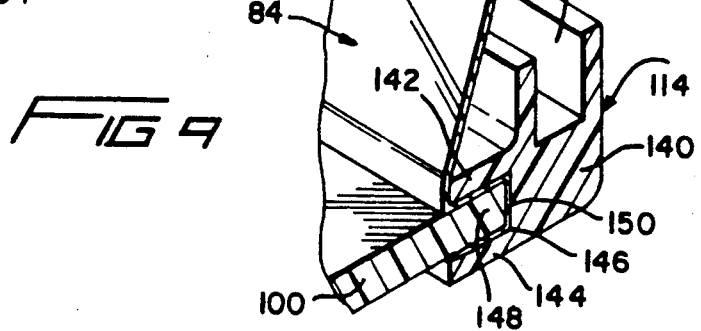

MOVABLE ROOT CONTACT/PRESSURE PLATE ASSEMBLY FOR HYDROPONIC SYSTEM

This invention was made with Government support under Grant No. NAG10-0024, awarded by the National Aeronautics and Space Administration. The Government has certain rights in the invention.

This is a continuation of co-pending application Ser. No. 07/156,013 filed on Feb. 16, 1988 now U.S. Pat. No. 4,860,490.

The present invention relates, in general, to hydroponic systems and, more particularly, to apparatus for use in such systems to promote the growth of sweet potato storage roots and possibly other root and tuber crops.

The sweet potato ranks seventh in world crop statistics after wheat, rice, maize, white potato, barley and cassava and ranks ninth in harvested weight when compared to the twenty major world foods (milk, beef, fish, pork and sixteen plant species). Sweet potato storage roots are high in carbohydrates and vitamin A (orange flesh varieties) and are a good source of vitamin A, potassium, calcium, iron and dietary fiber. In a number of countries, sweet potato leaf tips are eaten as a green vegetable. "Non-sweet" sweet potatoes taste and can be prepared like white potatoes.

Because of its nutritional content and versatility, the sweet potato has been selected by the National Aeronautics and Space Administration (NASA) as one of the crops to be studied for adaptability for growth in Controlled Ecological Life Support Systems (CELSS) on long-term space missions. In order to minimize the mass and volume requirements of a growing system, NASA has indicated the need to develop hydroponic systems which do not require the use of an aggregate material as the cultural medium for growing food crops in CELSS. The advantages of using such hydroponic systems for greenhouse production of specialized crops in space, as well as on earth, include the ability to accurately measure and control water, nutrients, oxygen and temperature.

Although numerous hydroponic systems have been developed for use in the research in and commercial production of vegetables, flowers and ornamental plants, few systems have been developed for the commercial production of root and tuber crops such as sweet potato and white potato. Most hydroponic systems developed to date have been for tomatoes, lettuce and cucumbers. For those instances when hydroponic growth of root/tuber crops has been carried out, in most cases only early growth, i.e., less than 80 days, was measured whereas full term production for optimum yield requires 90 to 150 days growth. As a result, the enlargement of storage roots was low, often less than 200 grams per plant, or did not occur at all. In almost all of these systems involving root/tuber crops, an aggregate such as sand, soil, sawdust, peat moss, perlite, vermiculite, or some mixture of these aggregates was used as the cultural medium.

A commonly used system for growing crops is the nutrient film technique (NFT), which is an aggregateless hydroponic system in which plant root systems are exposed to a film of nutrient solution within a plastic trough. Such a system is used to grow commercial tomatoes, lettuce, cucumbers, flowers and ornamental plants. Although numerous studies have evaluated the nutrient film technique for food crop production, such studies have not been directed to the use of NFT to produce sweet potatoes and other root crops. In an article published in Plant Physiology, Vol. 23, pages 223-235 (1948), entitled "Effect of Nutrient Level on the Growth and Chemical Composition of Sweet Potatoes in Sand Cultures" by O. A. Leonard et al, a hydroponic system for growing sweet potatoes using 8-liter pots filled with sand was described. Up to 1300 grams of storage root/plant were produced in this system in 136 days.

In an article entitled "On the Solution Culture of Sweet Potatoes" published in the Rep. Soc. Crop Sci. Breed, Kinki, Vol. 32, pages 60-64 (1987), T. Uewada described a procedure in which sweet potato plants were started in sand for 20 days to produce roots long enough so that, when they were transferred into a PVC box, the roots grew 12 inches (30 cm.) down into a 0.8 inch (2 cm.) static nutrient pool. This system produced up to 1550 grams of storage root/plant in 130 days. However, in both the Leonard et al and the Uewada systems, an aggregate was required.

SUMMARY OF THE INVENTION

It is, therefore, an object of the present invention to provide a hydroponic system for improved growth of the storage root and plant of sweet potatoes and other root and tuber crops.

It is another object of the present invention to provide an apparatus for growth of plant roots in a hydroponic system which does not require the use of an aggregate material, thereby reducing the mass and volume of the growing system.

It is a still further object of the present invention to provide a hydroponic system which will yield, without the use of an aggregate cultural medium, increased growth of storage roots and plants in a shorter period of time than was possible in prior systems, including those which used an aggregate cultural medium.

Briefly, the present invention is directed to a nutrient film hydroponic system which consists of a nutrient solution reservoir, a plurality of growing channels which contain movable root contact/pressure plate assemblies for supporting the plants and providing needed pressure on the root system, a pump and feed pipe system for delivering nutrient fluids to the growing channels, and a timing mechanism for regulating the operation of the pump. The nutrient solution reservoir is a repository from which and to which the nutrient solution is pumped or flows during the operation of the system. The pump preferably is in a feed line which conveys nutrient solution from the reservoir to the growing channels, although the pump in another configuration may be provided in a return line from the growing channels to the reservoir. The pump provides the nutrient to the growing channel either continuously or with an intermittent flow which is controlled by the timing mechanism. The timing mechanism may be a mechanical clock or a digital clock, or may be a more complex controller such as a computer, to regulate the volume and rate of flow of the solution. The growing channels are troughs in which the plants are placed. The plants are supported within the channels by movable root contact/pressure plate nourishment from the nutrient solution. Each movable pressure plate assembly accommodates plant storage root enlargement, maintaining a desired pressure on the roots while at the same time being free to move upwardly in its growing channel as the roots enlarge. The nutrient solution is pumped into one end of the channel and flows through the channel back to the reservoir. Alternatively, the fluid can be pumped out of the channel to the reservoir. A range of environmental parameters and a number of nutrient solution compositions and application protocols support the growth and root enlargement of plant cultivars in the system.

The present system was designed specifically for sweet potato production, and will be described in terms of this crop. However, it will be understood that other tuber and root crops may equally well be grown in this system. The present growing system has produced yields of over 1300 grams of storage roots for a single plant in 105 days, with over 3,000 grams total biomass being produced for that single plant. In one test of the system, the mean storage root weight for 4 plants in the same hydroponic growing system was 950 grams per plant, with a mean fresh foliage weight of over 1,100 grams per plant. It was found that the system provides sweet potato root enlargement without the use of an aggregate, allows control of the nutrient solution composition and its application protocol throughout the growing cycle, and permits control of environmental parameters such as temperature, percent relative humidity, light intensity, and the like, to effectively produce root and tuber crops. The system differs from hydroponic systems used for non-root/tuber crops in that not only is the nourishment of fibrous or feeder roots and the support of foliage maintained, but also a pressure mechanism is provided, which is important for the formation and enlargement of storage roots.

BRIEF DESCRIPTION OF THE DRAWINGS

The foregoing and additional objects, features and advantages of the present invention will become apparent from a consideration of the following detailed description of a preferred embodiment thereof, taken in conjunction with the accompanying drawings, in which:

FIG. 2 is a top perspective view of a hydroponic system constructed in accordance with the present invention;

FIG. 2A is an enlarged perspective view of a portion of a support leg for the system of FIG. 2;

FIG. 2B is an enlarged, partial end view of the nutrient feed pipe manifold for the system of FIG. 2;

FIG. 2C is an enlarged perspective view of the return nutrient manifold for the system of FIG. 2;

FIG. 3 is a top plan view of the hydroponic system of FIG. 2;

FIG. 4 is a top perspective view of a growing channel and pressure plate assembly for the system of FIG. 2 and constructed in accordance with the present invention;

FIG. 5 is a top plan view of the growing channel and pressure plate assembly of FIG. 4;

FIG. 6 is a side elevation view of the growing channel of FIG. 4;

FIG. 7 is a cross-sectional view of the channel and pressure plate assembly of FIGS. 4, 5 and 6, taken along lines 7—7 of FIG. 5;

FIG. 8 is a partial, enlarged perspective view of the upper edge of one wall of the growing channel and pressure plate assembly of FIG. 7; and FIG. 9 is a partial, enlarged perspective view of one edge of the movable pressure plate assembly in the growing channel of FIG. 7.

DESCRIPTION OF PREFERRED EMBODIMENT

Figure 1:
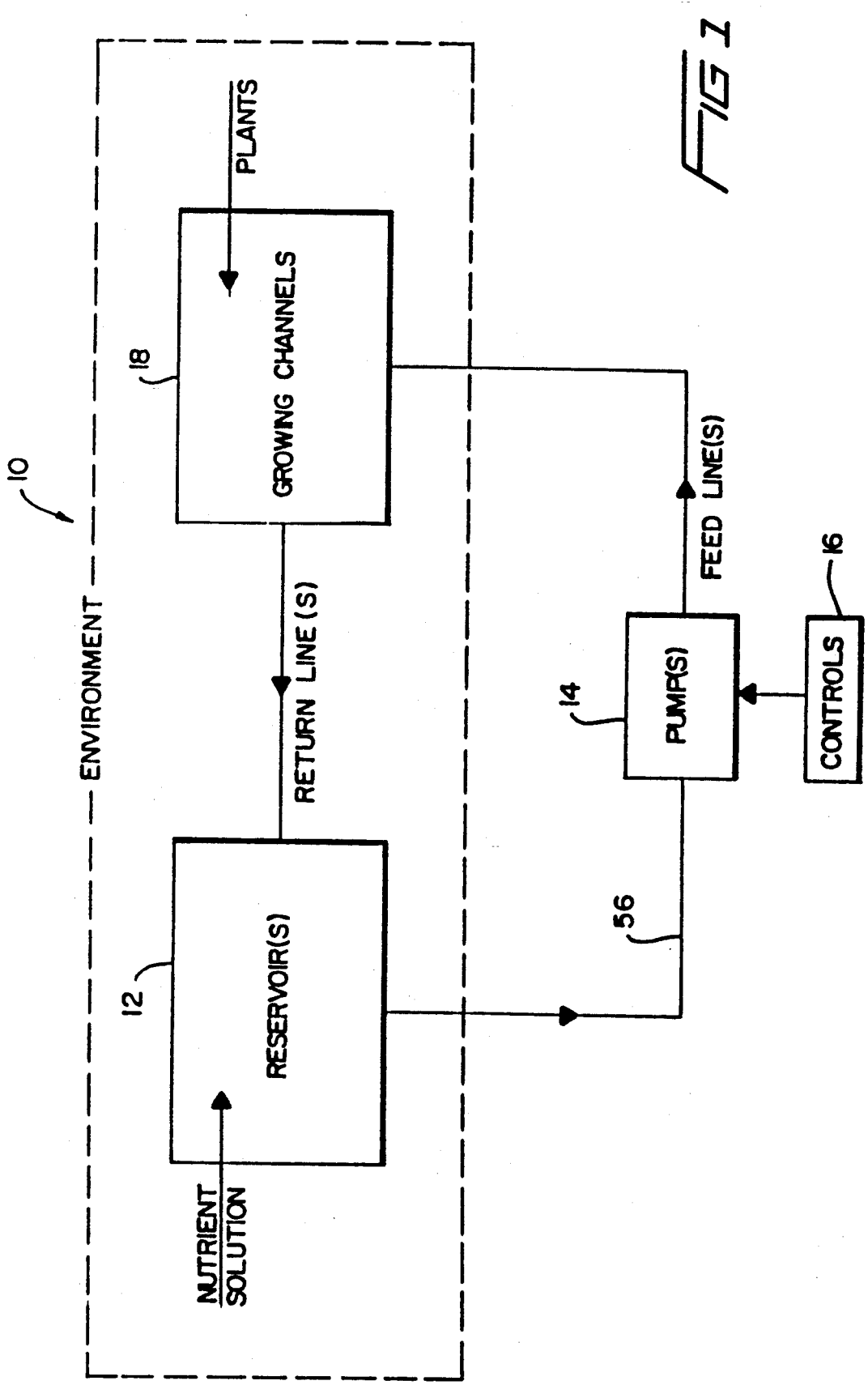
FIG. 1 is a schematic diagram of a hydroponic growing system.

Turning now to a more detailed consideration of the present invention, there is illustrated in FIG. 1 in schematic form and in FIGS. 2 and 3 in diagrammatic form, a hydroponic growing system, generally indicated at 10, of the type which may utilize the growing channel and pressure plate assembly of the present invention. As illustrated, the hydroponic system 10 includes four major components, a nutrient solution reservoir 12, a pump 14, a control or timing mechanism 16, and a plurality of growing channels generally indicated at 18 in FIG. 1, and including channels 20, 22 and 24 in the embodiment of FIGS. 2 and 3. In a prototype system which has been built and operated, the reservoir 12 included a single 31.7 gallon (120 liter) tank, although other designs have used three 10.6 gallon (40 liter) reservoirs. These reservoirs are designed to accommodate the nutrient solution required to provide all the nutrients required by the plants which are grown in the growing channels 18, and can be any size and number depending on the number, size and length of the growing channels. The reservoir may be fabricated from polyvinyl chloride-1 (PVC-1), but other materials have been commercially used in hydroponic systems and can also be used in the present system.

The channels 18 preferably are in the form of elongated, shallow boxes including elongated side walls 26 and 28, as illustrated in FIGS. 4, 5 and 6 for the channel 20. The ends of the channels are closed by end walls 30 and 32, the bottom is closed by a bottom wall 34, and the top is open. Although the channels may vary widely in shape and size, a prototype system utilized channels 6 inches (15 cm) in height by 48 inches (2.2 m) in length, with a width of 6 inches (15 cm). These channels may be fabricated from any suitable material, such as PVC-1, and may have a wall thickness of about 0.25 inch (0.6 cm). The channels and the reservoir preferably are mounted on a suitable frame 40 (FIG. 2) which may include longitudinal beams 42 and lateral supports 44 and 46 for the growing channels 18, and longitudinal beams 48 and lateral supports 50 for the reservoir 12, all supported by legs 52. The legs and frame elements may be formed of angle iron or other suitable structural elements, and in the preferred form of the system, the legs 52 are adjustable in length, as illustrated in FIG. 2A, to permit modification of the slope of the growing channels. For this purpose, adjustable pads 54 may be threadedly connected to bottom plates 56 secured to legs 52 and may be threaded into and out of corresponding sockets 58 formed on plates 56 for height adjustment. The adjustable pads 54 may be carriage bolts, for example.

The pump 14 may be mounted on the frame 40 or attached to reservoir 12. The pump, which in the prototype system was 1/20 horsepower, includes an inlet 60 (FIG. 2) which draws liquid nutrient from the reservoir 12 and supplies the nutrient through its outlet to a supply pipe 61 and through a control gate valve 62 to a nutrient feed pipe manifold 63 (FIG. 2B) and supply pipes 64, 66, and 68, for the respective growing channels 20, 22 and 24. A bypass line 70 having a bypass gate control valve 72 is connected between the supply pipe 61 and the reservoir 12 to provide a recirculating path for the nutrient solution when gate valve 62 is partially or completely closed. The flow rate of nutrient from manifold 63 into the three growing channels is controlled by the two gate valves 62 and 72, the flow to the channels 18 being increased by opening gate valve 62 and partially or completely closing valve 72 to restrict the bypass. The flow rate to channels 18 can be reduced by partially closing valve 62 and opening valve 72. The amount of nutrient flowing through the bypass line thus limits the flow of nutrient to the growing channels. The timer 16 controls the on-off time of pump 14 to regulate the frequency and amount of the nutrient application to the growing channels. Although the valves 62 and 72 are shown as being manually operated, these may be electrically controlled by the timing system or by a suitable controller such as a microprocessor (not shown), if desired.

Nutrient solution supplied to channels 20, 22 and 24 flows along the bottom of the channels from the supply end at wall 30 to the drain end near end wall 32, where excess nutrient is drained from each channel by gravity into return manifold 74 via drain pipes, 76, 77 and 78, illustrated in FIGS. 2C and 3, and is returned to the reservoir 12 via drain pipe 80. A gate control valve 82 may be provided in the return pipe 80, if desired.

Although a gravity flow of the nutrient from each channel to the reservoir is preferred, a return pump may be provided. Further, although the drain pipes 76-78 are shown as being connected to the return manifold 74 for drainage, they may drain directly into the reservoir. The size of the pipes and pumps, their location, and the size and location of the reservoir and growing channels with respect to each other are not critical. For example, the growing channels may have a variety of configurations, or may be in a variety of relative locations, with the nutrient flow being by gravity or controlled by pumps.

A critical feature of the present invention is the provision of a movable root contact/pressure plate assembly. This assembly is composed of an elongated flat plate, two plate connectors, and two sheets of vinyl film. The assembly is present in each of the growing channels, as illustrated at 84, 86 and 88 in the channels 20, 22 and 24, respectively. These assemblies not only support the plants to be grown in each of the growing channels, but provide the required pressure to initiate storage root enlargement. The assemblies 84, 86 and 88 incorporate flat plates 100, 102 and 104, respectively, which are illustrated in the top plan view of FIG. 3. The three movable root contact/pressure plate assemblies 84, 86 and 88 are identical and the following description of assembly 84 applies to all three.

Assembly 84 includes an elongated, flat plate 100 which, as illustrated in FIGS. 3-5, is slightly shorter than the length of channel 20 and is narrower than the channel, preferably about one third its width. In the prototype system, the plate was constructed of PVC-1 and was 44.5 inches (113 cm) in length, was 2.5 inches (6.4 cm) wide, and was 0.25 inches (0.6 cm) in thickness. A series of plant-receiving apertures 106 about 1 inch (2.5 cm) in diameter were provided at spaced locations along the longitudinal axis of the plate 100, with four apertures being illustrated in that embodiment. These apertures passed vertically through the plate 100 and received the plants which were to be grown in channel 20.

The movable root contact/pressure plate assembly 84 is suspended for vertical motion within the growing channel 20 with the plate 100 initially at about the level of the nutrient solution by means of thin flexible sheets 108 and 110 which are connected at their lower edges to the plate 100 and at their upper edges to the top edges of the side walls 26 and 28 of channel 20. Sheets 108 and 110 extend the full length of the plate 100 and preferably are formed of an opaque plastic film, such as a black-white vinyl film, to prevent light from reaching the nutrient solution in the bottom of the channel so as to prevent the growth of algae in the solution. The film is of sufficient width to suspend the plate 100 close to, but spaced from, the bottom wall 34 of the channel, preferably between 0.25 and 0.5 inch (0.6 and 1.2 cm) from the bottom wall.

The vinyl sheets 108 and 110 are secured at their upper edges to the walls 26 and 28 and at their lower edges to the plate 100 in any suitable manner, but preferably are held in place by means of friction connectors such as those generally illustrated in FIG. 7 as wall edge connectors 112 and 112' and plate connectors 114 and 114'. These connectors are illustrated in greater detail in FIGS. 8 and 9.

As illustrated in FIG. 8, the friction connector 112 (and similar connector 112') is generally H-shaped in cross section, having a pair of downwardly extending, spaced legs 116 and 118 which are spaced apart to straddle the top edge 120 of wall 26 and to frictionally engage the wall to hold the connector in place. The connector 112 includes a central web 122 which extends between legs 116 and 118 and which rests on the top edge of wall 26 when the connector is in place. Extending upwardly from web 122 are a pair of spaced legs 124 and 126 which define an upwardly facing cavity 128 which extends along the length of the wall 26. Cavity 128 receives the upper edge portion 130 of the sheet 108 and a longitudinal plug 132, which fits down into the upwardly facing channel 128 to secure the edge 130 of sheet 108 in the channel. Plug 132 preferably extends the full length of channel 128 and is sufficiently thick to provide a friction fit between legs 124 and 126 to secure the upper edge of the vinyl sheet 108 firmly in place. The filler block 132 preferably extends above the ends of legs 124 and 126 so that it can be grasped for removal and adjustment or replacement of sheet 108. In similar manner connector 112' secures the upper edge portion of sheet 110 to the top of wall 28.

The plate connector 114 includes an elongated body portion 140 which extends the full length of plate 100 and includes a pair of horizontally extending, spaced legs 142 and 144, the legs defining a channel 146 which extends the full length of body portion and 140 which is sufficiently wide to straddle the longitudinal edge 148 of plate 100. The lower edge portion 150 of vinyl sheet 108 folds around the edge 148 of the plate 100 and the plate connector 114 is then pressed onto edge 148 to hold the vinyl sheet in place. The friction fit of the connector 140 on the plate 100 holds the edge portion 150 in place, so that the sheet 108 supports plate 100 so the connector and the sheet become an integral part of the movable root contact/pressure plate assembly 84. In similar manner, vinyl sheet 110 is secured at its lower edge by connector 114', and these also form an integral part of assembly 84.

Connectors 114 and 114' are provided with upwardly facing channels 152 and 152' which can, if desired, receive central portions of sheets 108, and 110, respectively. The central portions may be held in place within each of the channels by a plug or filler bar, such as that shown at 132, to shorten the vinyl sheets 108 and 110 to keep them relatively taut when the plate assembly 84 has been raised upwardly by the growth of roots within the channel 20 and beneath the assembly 84. This arrangement also permits manual lifting and adjustment of the assembly above the bottom wall 34 of the channel 20, if desired.

The movable root contact/pressure plate assembly 84 serves two main functions. First, the plate 100 provides support for the plant stem which is to be grown in channel 20. The stem is placed in one of the apertures 106 so that its roots will be below the plane of plate 100 and the foliage above, and in those cases where the plant stem is much smaller than the aperture 106, the plant can be held in place by a small piece of foam or other sponge-like material inserted in the aperture around the plant stem. This foam holds the plant in place and prevents both horizontal and vertical movement. The second main function of the assembly 84 is to provide a rigid upper surface for contacting the root system particularly when root enlargement is in the initial stages. The connectors 114 and 114' extend the edges of the plate 100 toward the side walls 26 and 28 so the plate and the connectors provide a rigid upper contact surface for the roots in a root zone 154 below plate 100. The channel walls 26, 28 and 34 provide contact surfaces on the other three sides of the root zone. Thus, the roots come into contact with rigid walls on all four sides of the zone 154 as the root system grows and expands. This contact, and the pressure which is supplied on top of the root system by the mass of the assembly 84 by any plant growth which occurs above the plate 100 between support sheets 108 and 110, and by root growth which occurs between the assembly 84 and walls 26, 28 and 34 has been found to stimulate storage root enlargement which is a significant improvement in hydroponic sweet potato production. If the movable root contact/pressure plate assembly 84 was not rigid, but was pliable, then as the root system grew, pressure would be released upon contact of the roots with the pliable surface, and root enlargement would not be enhanced.

The unique results obtained through the provision of pressure and contact surfaces around the root cavity for a hydroponic system was demonstrated in several experiments wherein the growth obtained in sweet potato plants by the growing channels of the present invention was compared to growth obtained in static systems. In these experiments, a sweet potato plant cutting was placed at the center of a horizontal PVC-1 mesh grate fixed at 4.3 inches (11 cm) from the bottom of a one gallon (3.8 liters) pot. An initial nutrient solution of 0.75 gallon (2.8 liters) was supplied at a level of 4.5 inches (11.5 cm) from the bottom of the pot which was 0.2 inch (0.5 cm) above the top of the grate. No solution was added for 30 days, but on the 31st day the nutrient solution was again added to bring the solution up to the 4.5 inch level. After that, the level was checked daily to be certain it was maintained at that level. A similar experiment was carried out with a rectangular pan 10 by 12 by 5 inches (25 by 30 by 13 cm), with a nutrient level maintained at 3 inches (7.5 cm). Examination of both the circular pot and the rectangular pan indicated that storage root enlargement occurred only when the initiated root grew between openings on the grid or between the grid and the side of the pot or pan. Thus, only when there was at least one point on the potential storage root where pressure occurred because the root was pressing against the plastic pot or pan did enlargement occur. In contrast, in the channels of the present invention, experimentation showed that the largest storage root growth occurred where the roots were clearly pressed against the movable root contact/pressure plate assembly 84 and at least one surface wall of the channel or where the roots were pressed against other enlarged roots with the entire mass pressing at least three of the four surfaces. Thus, it was clear that pressure was a significant factor in root enlargement.

A unique component of the assembly 84 of the present invention is its movability. The connectors 112, 114 and 112', 114' affix the vinyl sheets 108 and 110 to the plate 100 so that when storage root enlargement occurs, the entire pressure plate assembly 84 is moved upwardly by the growing roots which expand in response to the pressure applied by the assembly and by the plant foliage carried by the plate. This maintains a continuous pressure on the roots throughout their growth period, resulting in an improved yield.

Various nutrient solutions may be used in the system of the present invention and a wide range of plant types can also be grown. It is known that different plant species respond variously to different nutrient solution compositions, but a standard solution is frequently used which includes adequate amounts of each essential nutrient for the plant. Modifications to the solution can be made as needed by increasing or decreasing any nutrient, based on the needs of the plant. Nutrient solution compositions used to grow sweet potatoes hydroponically to full term, (i.e. 90 to 150 days) have varied. In an open sand aggregate study, reported by Leonard et al in the publication listed above, more than one thousand grams per plant in 135 days of growth was produced, using several different nutrient compositions. As indicated in the Uewada publication listed above, a combination aggregate and water culture system has produced more than 1500 grams per plant in 130 days. This was accomplished by changing the nutrient solution composition during the course of the growth, using $NH_4NO_3$ for the first 30 days, and then only $KCl$ and $KH_2PO_4$ thereafter. Thus, a wide range of nutrient solution compositions are adequate for providing more than one kg of sweet potato storage root.

The hydroponic system of the present invention provides a yield which exceeds that available with prior systems, and has produced 1,300 grams per plant in 105 days. The nutrient used was the half-strength of solution described by D. R. Hoagland et al in "The Water-Culture Method for Growing Plants Without Soil", circular 347, Berkeley: California Agricultural Experiment Station, University of California (1938, 1950), which was changed on a biweekly basis. Enlarged roots were also obtained using a 67 percent solution for one month, followed by a 61 percent solution for 2 weeks, thereafter utilizing deionized water for 2 weeks, with a fresh application of a 61 percent Hoagland solution before finishing with deionized water until harvest. Though intermittent application of nutrient solution produced enlarged roots, a continuous application of nutrient is preferred.

The foregoing results illustrate that both continuous application of a moderately concentrated nutrient solution or an intermittent protocol with a moderate to high concentration nutrient solution and a subsequent decrease in solution concentration will also produce enlarged roots in the growing channels of the present invention. The upper and lower limits of nutrient solution concentration depend upon the plant variety, environmental conditions, and length of time the plants are grown. Thus, one experiment showed that a 25 percent Hoagland solution supplied throughout the growing season gives low storage root/foliage yields compared to a 50 percent strength solution. It was also found that full strength solutions imposed for the entire growing season provides excess foliage and few enlarged storage roots.

The preferred nutrient solution composition and protocol is the continuous application of a solution which consists of, in ppm, 58–116N as $NO_3$; 7–14N as $NH_4$; 117K; 80 Ca; 24 Mg; 16 P; 32 S; 0.25 Mn; 0.025 Zn; 0.01 Cu; 2 Fe; 0.25 B; 0.005 Mo; and 254 Cl, replaced biweekly with a fresh supply. The pH of the system preferably is between 5.5 and 6.5, with the electrical conductivity of the solution ranging between 500 and 2200 micromhos per centimeter, with the preferred range being between 900 and 1800.

Environmental requirements ambient to the growing channel for sweet potato growth and production include suitable temperature and relative humidity, and adequate light. Sweet potatoes are tropical crops and are normally sensitive to low temperatures. Sweet potatoes will grow at temperatures between 15° C. and 38° C., with maximum storage root growth being obtained at temperatures of about 25° C. during the day and 20° C. at night, and the preferred temperature range being between 25° and 29° C. during the day. Although sweet potatoes can grow at high relative humidity, the preferred range is between 70 and 75 percent relative humidity.

Both the intensity and duration of light are important for sweet potato production. Light intensities of 300 micromoles $s^{-1}m^{-2}$ to 2,000 micromoles $s^{-1}m^{-2}$ have resulted in storage root production. The preferred irradiance is between 450 and 900 micromoles $s^{-1}m^{-2}$. Although some sweet potato cultivars will produce storage roots with continuous light, the preferred light period is 12 to 18 hours. It has been found that several cultivars can produce enlarged roots in the growing channels of the present invention under the conditions described above.

Accordingly, there has been disclosed a new and improved hydroponic system with an improved growing channel for tubers and other root crops which will produce increased growth of storage roots. Although the invention has been described in terms of a preferred embodiment, it will be evident to those of skill in the art that variations and modifications may be made without departing from the true spirit and scope of the invention as set forth in the following claims.

What is claimed is:

1. A method for growing storage root crops, comprising:
   supplying liquid nutrient to a plant-growing container;
   supporting root crop plants above said liquid nutrient, said plants having at least some roots capable of developing into storage roots extending into contact with said nutrient solution;
   exerting a predetermined, continuous, growth-stimulating pressure on said roots capable of developing into storage roots while said roots are in contact with said nutrient and maintaining a substantially constant pressure thereon throughout the growth period thereof to thereby stimulate and promote storage root growth.

2. The method of claim 1, wherein the step of supporting said root crop plants includes supporting said plants in a hydroponic system including a nonaggregate culture medium.

3. The method of claim 2, wherein the step supplying liquid nutrient includes causing nutrient to flow through said plant-growing container.

4. The method of claim 2, wherein the step of exerting a growth-stimulating pressure includes applying an external compressive pressure to said storage roots.

5. The method of claim 4, further including providing a controlled environment for said storage root crops in said hydroponic system.

6. A method for growing sweet potatoes, comprising:
   supporting sweet potato plants having storage roots in a controlled-environment, aggregate-free hydroponic system including a liquid nutrient supply;
   positioning said plants to cause said plant storage roots to extent into contact with said liquid nutrient;
   applying an external, predetermined, compressive, growth-enhancing pressure only to said storage roots by compressing said storage roots against a hydroponic system container, and maintaining said pressure substantially constant throughout the growth of said storage roots, said pressure being sufficiently great to stimulate and promote storage root growth in excess of the storage root growth produced by such a hydroponic system in the absence of said growth-enhancing pressure.

7. A method for growing root crops hydroponically, comprising:
   supplying a nutrient solution to a plant growing channel;
   suspending in said channel a root contact/pressure plate assembly, said assembly including a plate suspended above the bottom wall of said growing channel to form a root chamber, said assembly being suspended for vertical motion within the channel;
   supporting plants to be grown through said plate with the roots of the plants extending below the plate into said nutrient solution;
   initially locating said plate close to the bottom wall of said growing channel so that growth of the roots within said root chamber will bring the roots into contact with said plate;
   exerting by means of said plate and plate assembly a growth-stimulating pressure on said roots while said roots are in contact with said plate to promote formation and growth of storage roots; and
   maintaining growth-stimulating contact and pressure on said storage roots while allowing said plate assembly to move away from the bottom wall of said growing channel to accommodate root enlargement while providing continuing pressure thereon.

8. The method of claim 7, further including providing a controlled environment for said plants.

9. The method of claim 7, wherein the step of suspending said contact/pressure plate assembly comprises supporting said assembly on flexible, adjustable supports, whereby said plate is adjustable with respect to said growing channel and is movable by pressure exerted by the growth of storage roots in said growing channel.

10. The method of claim 7, wherein the step of suspending a root contact/pressure plate assembly includes suspending an assembly having a predetermined weight which is sufficient, when in contact with the storage roots of said plants, to constantly exert on said roots, said growth-stimulating pressure.

* * * * *